(12) United States Patent
Hsieh

(10) Patent No.: US 12,528,531 B2
(45) Date of Patent: Jan. 20, 2026

(54) HANDLE STRUCTURE OF TROLLEY

(71) Applicant: HANDO INDUSTRIAL CO., LTD., Puxin Township (TW)

(72) Inventor: Hung-Ching Hsieh, Puxin Township (TW)

(73) Assignee: HANDO INDUSTRIAL CO., LTD., Puxin Township (TW)

( * ) Notice: Subject to any disclaimer, the term of this patent is extended or adjusted under 35 U.S.C. 154(b) by 370 days.

(21) Appl. No.: 18/448,489

(22) Filed: Aug. 11, 2023

(65) Prior Publication Data

US 2024/0051592 A1 Feb. 15, 2024

(30) Foreign Application Priority Data

Aug. 15, 2022 (TW) .................................. 111130661

(51) Int. Cl.
*B62B 5/06* (2006.01)
*B62B 1/00* (2006.01)
*B62B 1/10* (2006.01)

(52) U.S. Cl.
CPC . *B62B 5/06* (2013.01); *B62B 1/10* (2013.01)

(58) Field of Classification Search
CPC ..................................... B62B 5/06; B62B 1/10
See application file for complete search history.

(56) References Cited

U.S. PATENT DOCUMENTS

| | | | |
|---|---|---|---|
| 7,823,893 B2 * | 11/2010 | Meyers ..................... | B62B 1/12 280/47.29 |
| 9,643,631 B2 * | 5/2017 | Berlinger .................. | B62B 1/12 |
| 9,969,411 B2 * | 5/2018 | Belotti ...................... | B62B 1/12 |

* cited by examiner

*Primary Examiner* — Bryan A Evans
(74) *Attorney, Agent, or Firm* — Demian K. Jackson; Jackson IPG PLLC

(57) ABSTRACT

A handle structure of a trolley contains: two grips symmetrically mounted on the trolley, and a respective one grip includes: a first fixing portion, a second fixing portion, and a body. The first fixing portion is configured to be connected with the trolley. The second fixing portion is configured to be connected with the trolley and located below the first fixing portion. The first fixing portion and the second fixing portion are on an axial line. The body is defined between the first fixing portion and the second fixing portion, a first end of the body is connected with an outer side of the first fixing portion, and a second end of the body is connected with a rear side of the second fixing portion; the body includes a first extending portion, a first connection portion, a second extending portion, a second connection portion, and a third extending portion.

12 Claims, 9 Drawing Sheets

HANDLE STRUCTURE OF TROLLEY

TECHNICAL FIELD

The present invention relates to a trolley, and more particularly to a handle structure of the trolley.

BACKGROUND

A conventional trolley is a carry tool pushed or pulled manually. The trolley contains a holding portion which has multiple rollers fixed on a bottom of the holding portion, a rack disposed on a side of the holding portion and having two spaced columns extending upward from the rack, a handle between two upper ends of the two columns, and/or two grips extending rearward from the two upper ends of the two columns. In operation, objects are placed on a platform, and two hands of a user holds the handle or the two grips to push or pull the trolley, thus carrying the objects in a short distance easily to be applicable in life widely.

However, the handle or a respective one grip of the conventional trolley has only a holding portion, so the user cannot hold the handle or the respective one grip in a desired angle or height based on his/her height and using requirements, thus causing using inconvenience and poor application.

The present invention has arisen to mitigate and/or obviate the afore-described disadvantages.

SUMMARY

The primary aspect of the present invention is to provide a handle structure of a trolley which is capable of having various changes of angles and heights of two grips based on the height and desired holding position of a user so that the user pushes or pulls the trolley easily.

To obtain the above-mentioned aspects, a handle structure of a trolley provided by the present invention contains: two grips symmetrically mounted on the trolley, and a respective one grip includes: a first fixing portion, a second fixing portion, and a body.

The first fixing portion is configured to be connected with the trolley.

The second fixing portion is configured to be connected with the trolley and located below a bottom of the first fixing portion. The first fixing portion and the second fixing portion are on an axial line.

The body is defined between the first fixing portion and the second fixing portion, a first end of the body is connected with an outer side of the first fixing portion, and a second end of the body is connected with a rear side of the second fixing portion; the body includes a first extending portion, a first connection portion, a second extending portion, a second connection portion, and a third extending portion, such that the handle structure is configured to have various changes of angles and heights of the respective one grip by way of the first extending portion, the first connection portion, the second extending portion, the second connection portion and the third extending portion.

A connection direction of an end of the body and the first fixing portion is different from a connection direction of the other end of the body and the second fixing portion, an offset angle is defined between the first extending portion and the axial line with respect to the third extending portion and the axial line, and the offset angle is within 30 degrees to 135 degrees.

DETAILED DESCRIPTION

Figure 1:
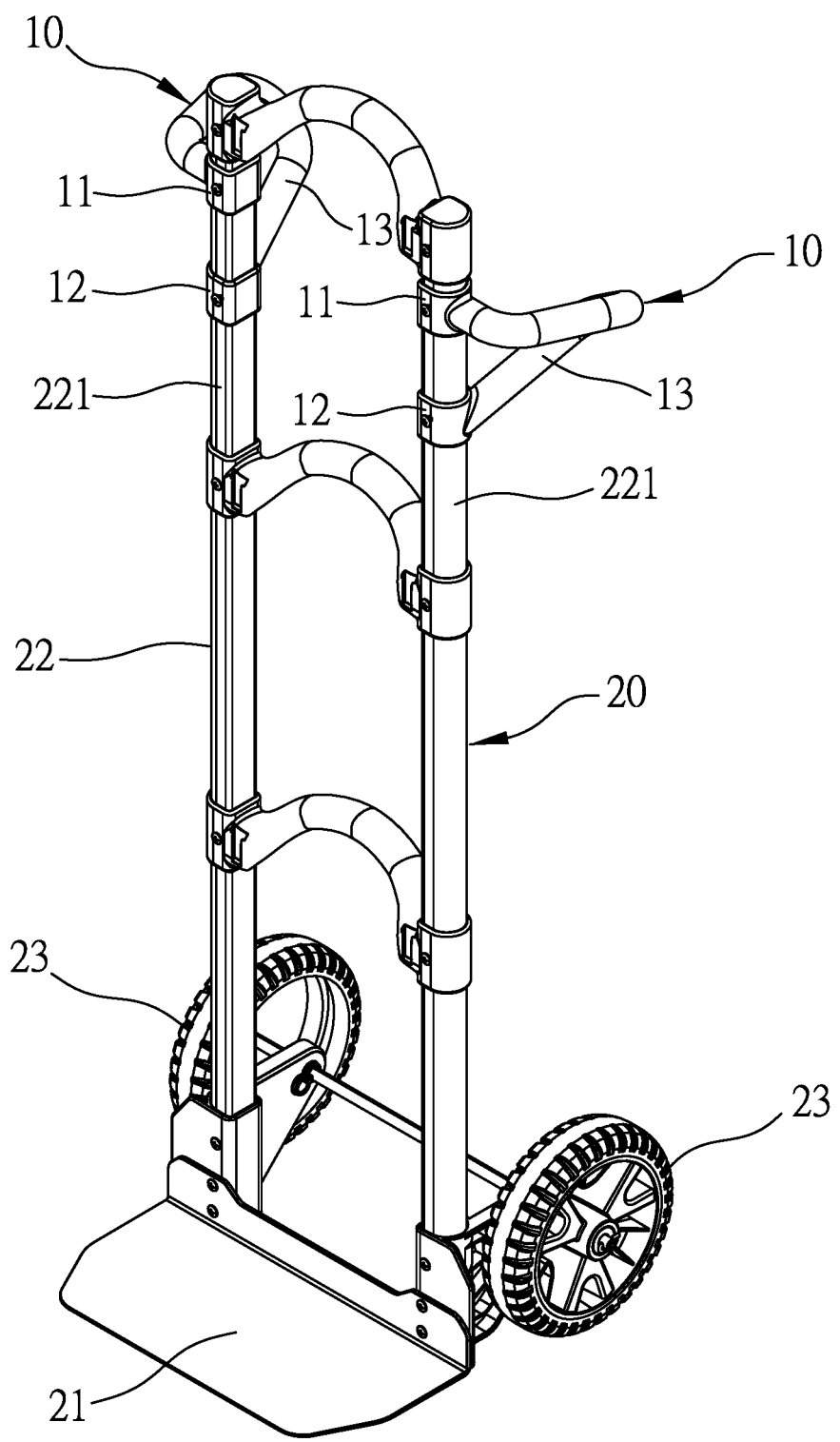
FIG. 1 is a perspective view showing the assembly of a trolley according to a first embodiment of the present invention.
Figure 2:
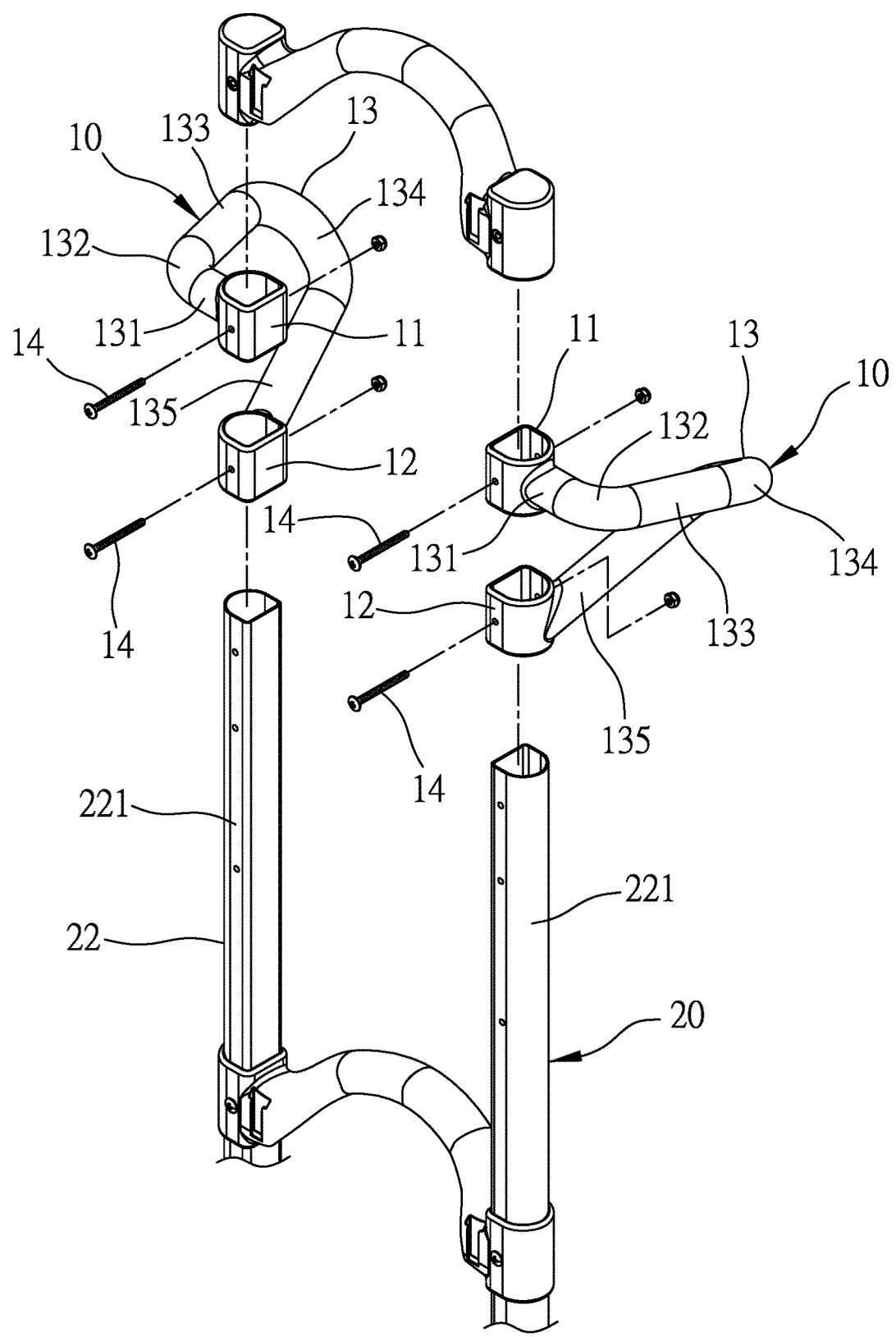
FIG. 2 is a perspective view showing the exploded components of a part of the trolley according to the first embodiment of the present invention.
Figure 3:
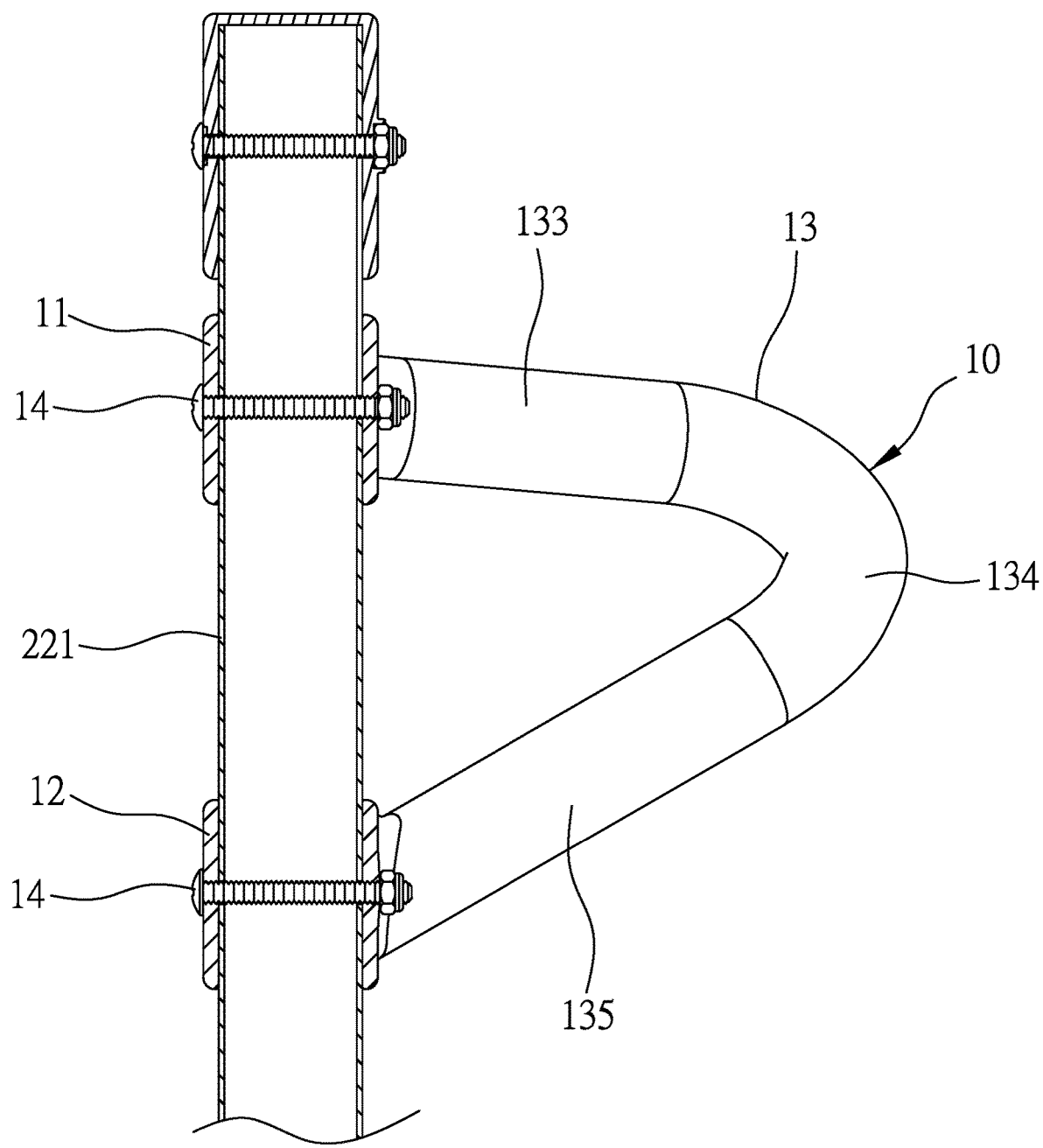
FIG. 3 is a cross-sectional view showing the assembly of a part of the trolley according to the first embodiment of the present invention.
Figure 4:
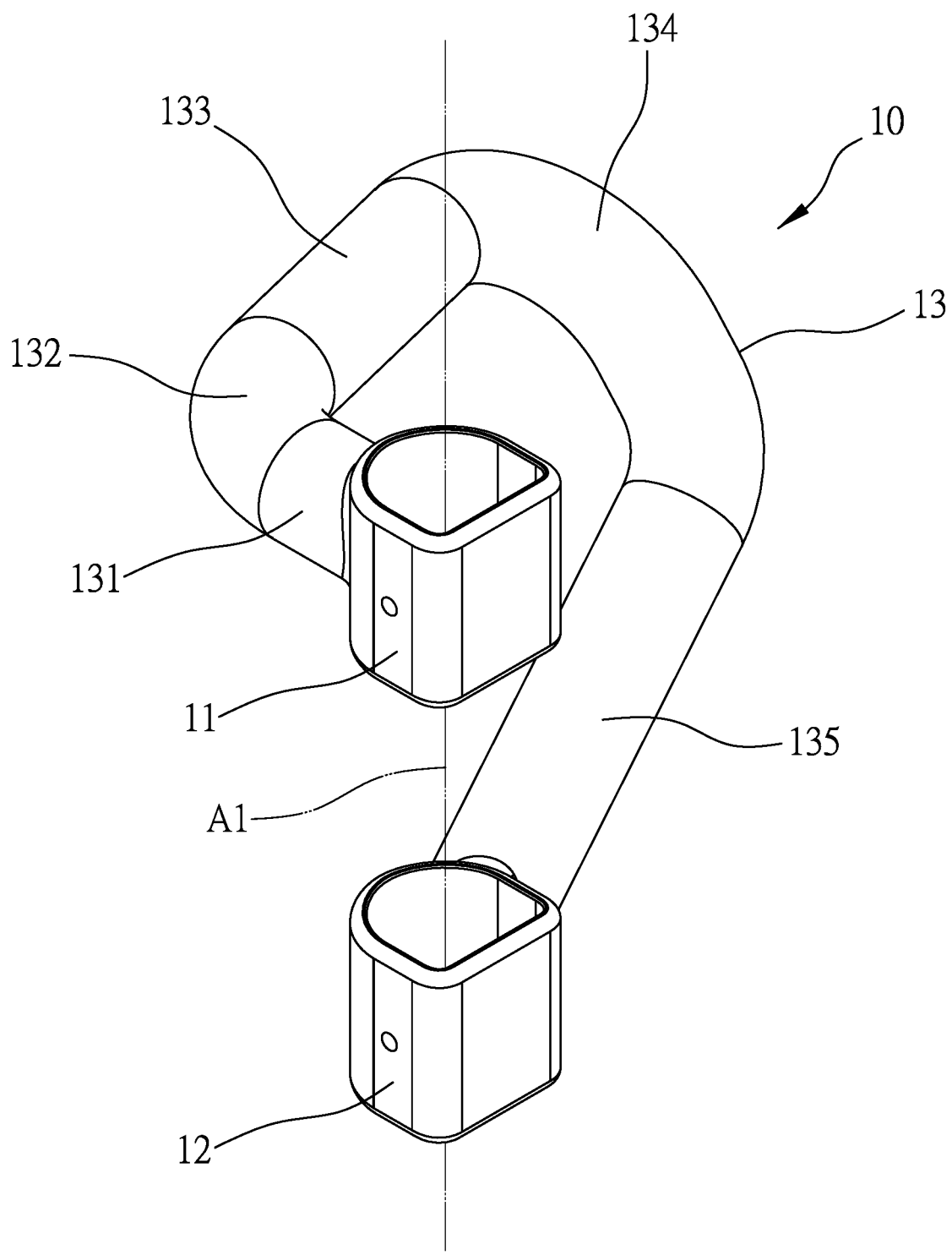
FIG. 4 is a perspective view showing the assembly of a respective one grip of the trolley according to the first embodiment of the present invention.
Figure 5:
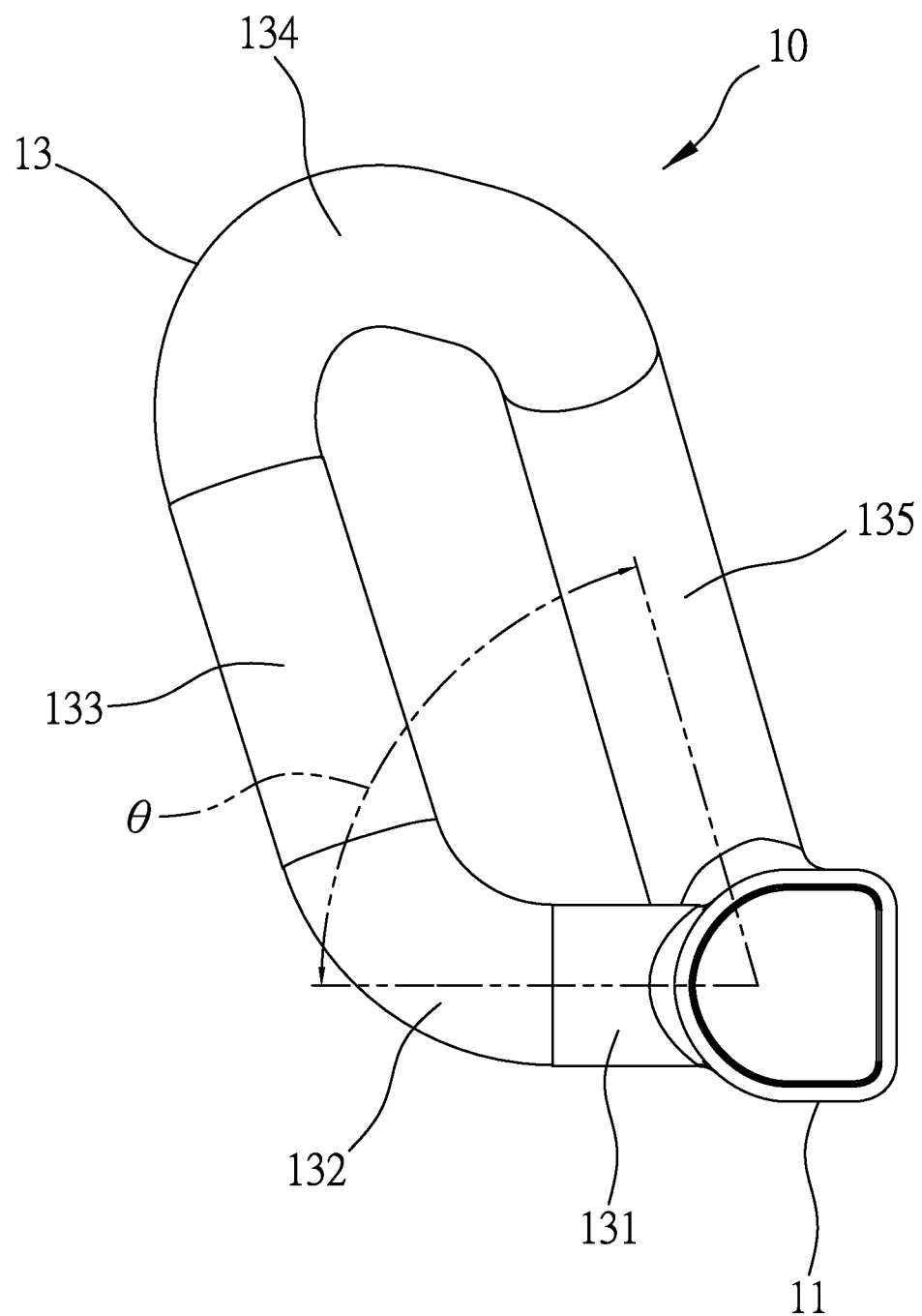
FIG. 5 is a top plan view showing the assembly of the respective one grip of the trolley according to the first embodiment of the present invention.

With reference to FIGS. 1-5, a handle structure of a trolley according to a first embodiment of the present invention comprises: two grips 10 symmetrically mounted on a trolley 20, and the trolley 20 includes a holder 21 configured to hold objects, at least one rack 22 connected on a side of the holder 21, and multiple rollers 23 fixed on a bottom of the holder 21, wherein the at least one rack 22 includes two columns 221 spaced from each other and extending uprightly, a cross-section of a respective one column 221 is in a D shape, and a respective one grip 10 includes a first fixing portion 11, a second fixing portion 12, and a body 13.

The first fixing portion 11 is a sleeve with a D-shaped cross-section and is configured to be fitted on a top of the respective one column 221, wherein the first fixing portion 11 of the respective one grip 10 is screwed with the trolley 20 by using at least one screw element 14.

The second fixing portion 12 is a sleeve with a D-shaped cross-section and is configured to be fitted on the top of the respective one column 221 and located below a bottom of the first fixing portion 11, wherein the second fixing portion 12 of the respective one grip 10 is screwed with the trolley 20 by using the at least one screw element 14, and the first fixing portion 11 and the second fixing portion 12 are on an axial line A1.

The body 13 is a hollowly circular tube and is defined between the first fixing portion 11 and the second fixing portion 12, wherein a first end of the body 13 is connected with an outer side of the first fixing portion 11, and a second end of the body 13 is connected with a rear side of the second fixing portion 12. The body 13 includes a first extending portion 131, a first connection portion 132, a second extending portion 133, a second connection portion 134, and a third extending portion 135. In this embodiment, the first extending portion 131 extends outward from the first fixing portion 11, the first connection portion 132 extends from the first extending portion 131, the second extending portion 133 extends from the first connection portion 132, the second connection portion 134 extends downward from the second extending portion 133, and the third extending portion 135 extends downward from the second connection portion 134, wherein the third extending portion 135 is connected with the second fixing portion 12, the first extending portion 131 and the second extending portion 133 are horizontal, the third extending portion 135 is inclined, and the first connection portion 132 and the second connection portion 134 are curved, wherein an angle of the second portion 134 is more than an angle of the first connection portion 132, a connection position of the body 13 and the first fixing portion 11 is not different from a connection position of the body 13 and the second fixing portion 12, a connection direction of an end of the body 13 and the first fixing portion 11 is different from a connection direction of the other end of the body 13 and the second fixing portion 12, an offset angle θ is defined between the first extending portion 131 and the axial line A1 with respect to the third extending portion 135 and the axial line A1, and the offset angle θ is within 30 degrees to 135 degrees. Preferably, the offset angle θ is within 65 degrees to 85 degrees.

Thereby, the handle structure of the present invention is configured to have various changes of angles and heights of the respective one grip by way of the first extending portion 131, the first connection portion 132, the second extending portion 133, the second connection portion 134 and the third extending portion 135 based on a height and a desired holding position of a user, hence the user pushes or pulls the trolley 20 by gripping the body 13 on a desired angle and height.

Figure 6:
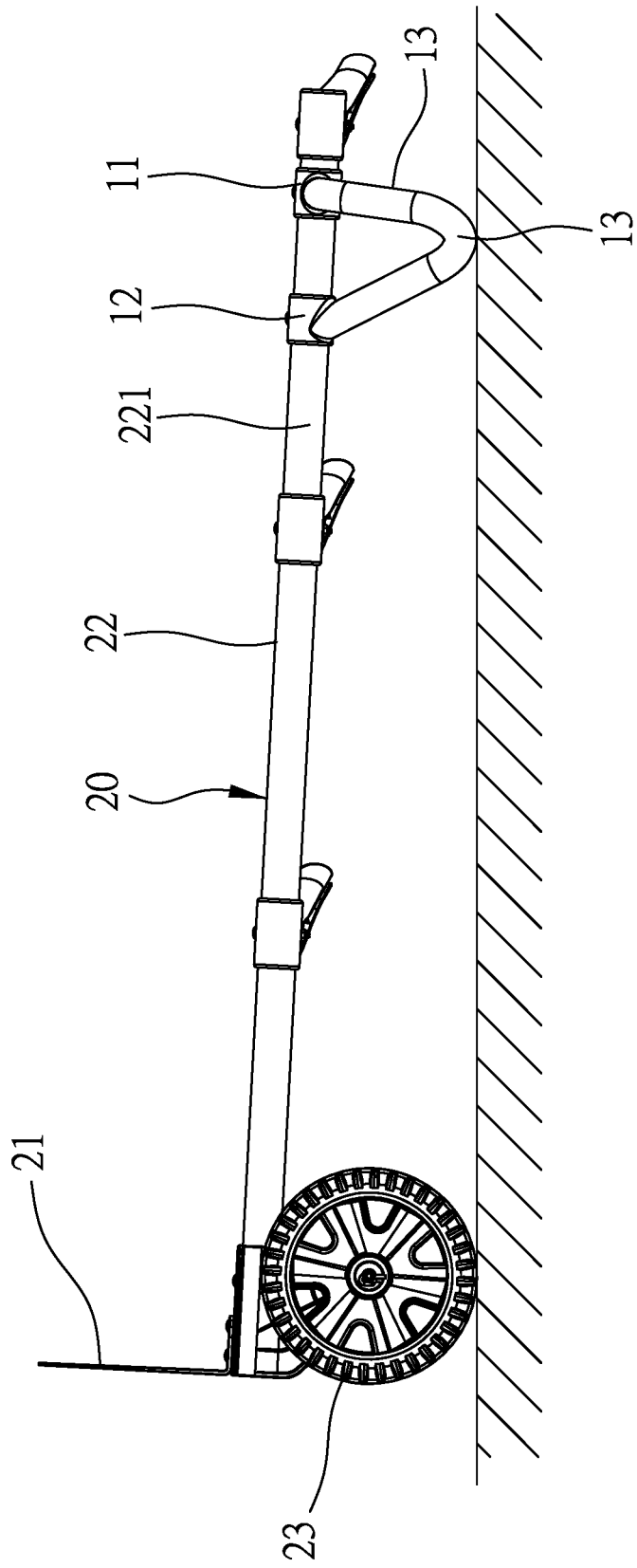
FIG. 6 is a side plan view showing the operation of the trolley according to the first embodiment of the present invention.

Referring to FIG. 6, when the trolley 20 is placed on a ground, the second connection portion 134 of the body 13 abuts against the ground to support and erect the trolley 20.

Figure 7:
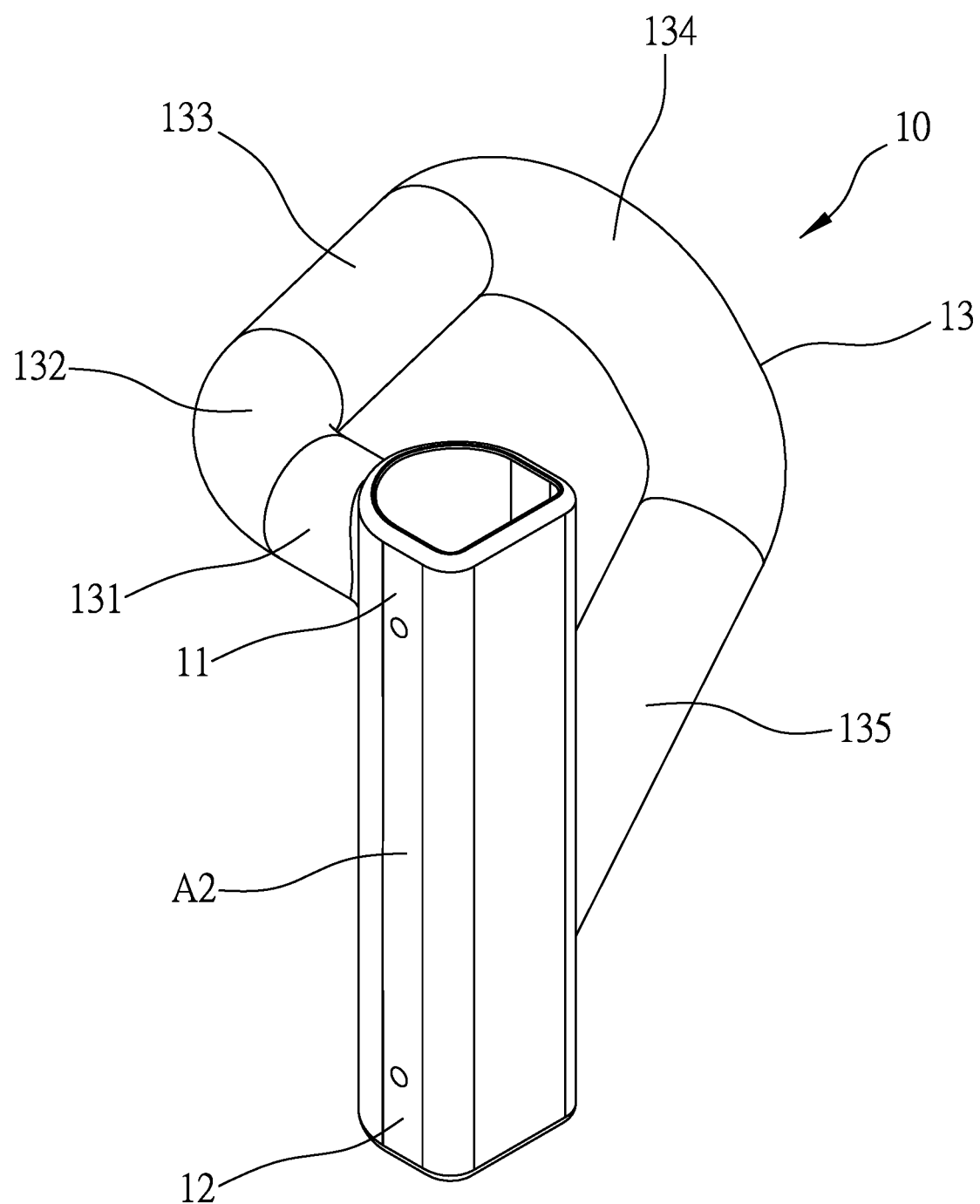
FIG. 7 is a perspective view showing the assembly of a respective one grip of a trolley according to a second embodiment of the present invention.

As shown in FIG. 7, a difference of a second embodiment is that the first embodiment comprises the first fixing portion 11 and the second fixing portion 12 being located on a tube A2, wherein the first fixing portion 11 and the second fixing portion 12 are one-piece formed.

Figure 8:
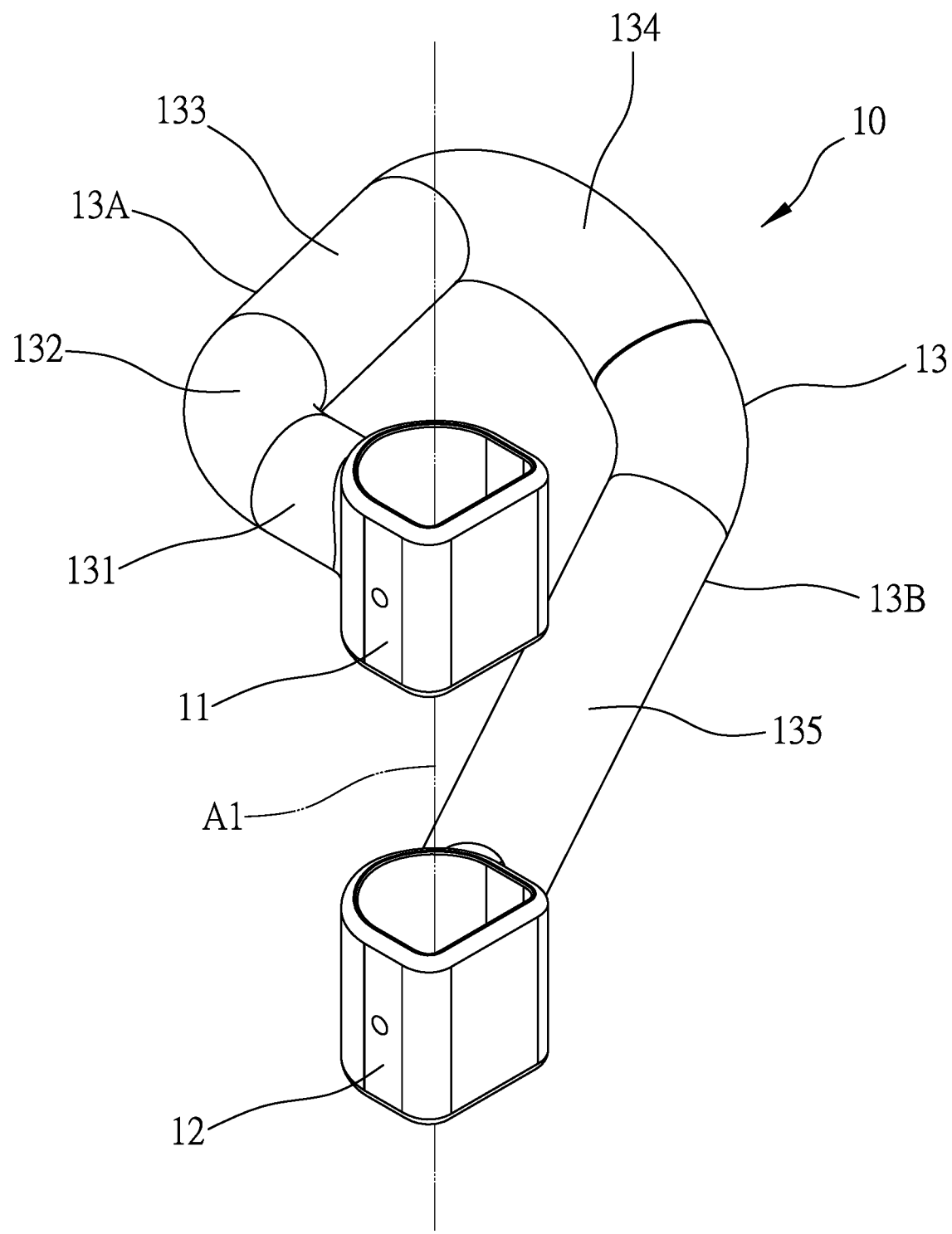
FIG. 8 is a perspective view showing the assembly of a respective one grip of a trolley according to a third embodiment of the present invention.
Figure 9:
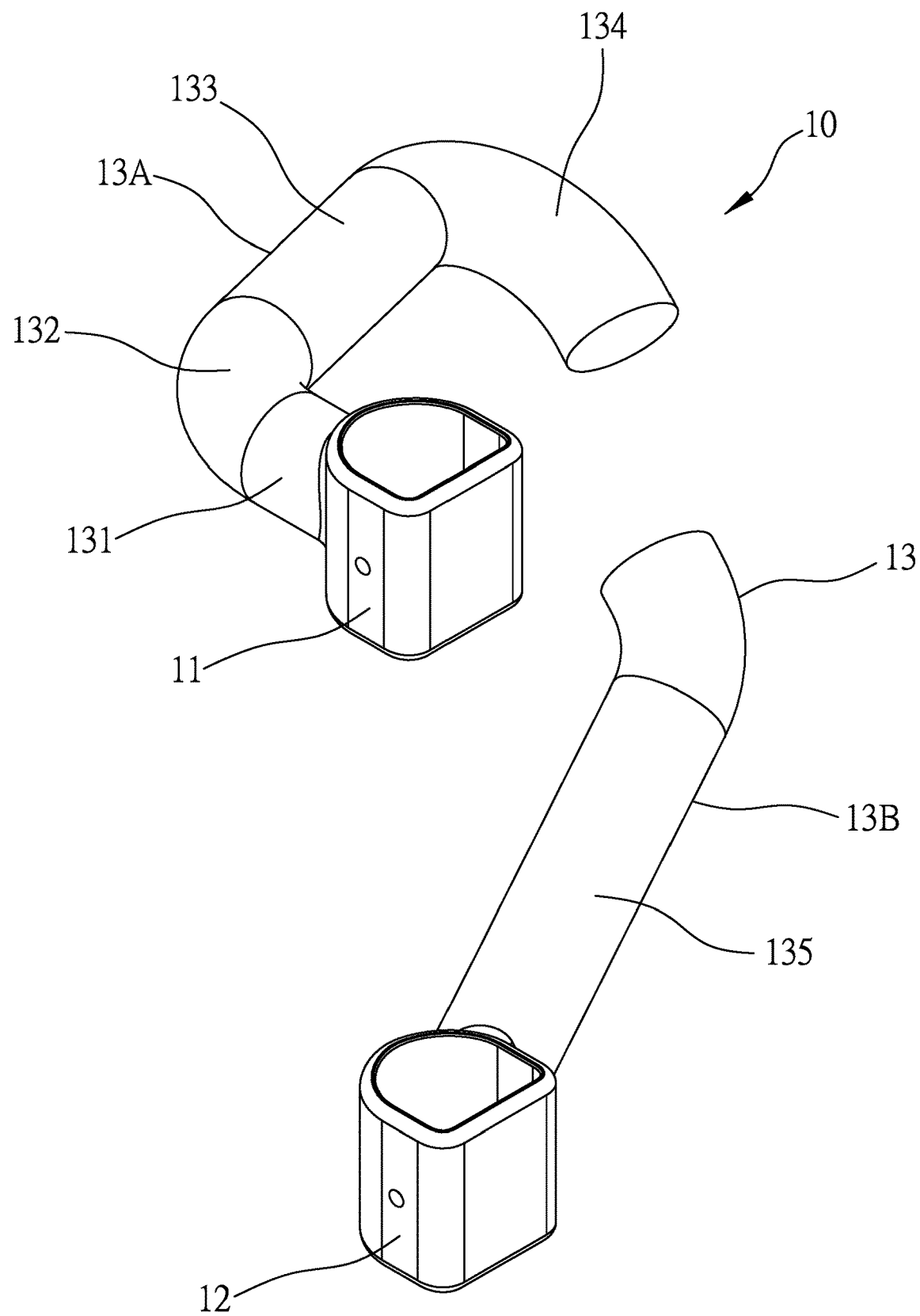
FIG. 9 is a perspective view showing the exploded components of the respective one grip of the trolley according to the third embodiment of the present invention.

As illustrated in FIGS. 8 and 9, a difference of a third embodiment from that of the second embodiment comprises: the body 13 including a first spaced section 13A and a second section 13B which are separated on a middle portion of the body 13, wherein the first spaced section 13A is connected with the first fixing portion 11, the second spaced section 13B is connected with the second fixing portion 12, and the middle portion of the body 13 separated from the first spaced section 13A and the second spaced section 13B are cut flatly.

Therefore, the handle structure of the trolley has the following advantages:

The body 13 includes a first extending portion 131, the first connection portion 132, the second extending portion 133, the second connection portion 134, and the third extending portion 135 so as to have the various changes of the angles and heights of the two grips 10 based on the height and the desired holding position of the user, and the user pushes or pulls the trolley 20 by gripping the body 13 on the desired angle and height easily.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A handle structure of a trolley comprising:
two grips symmetrically mounted on the trolley, and a respective one grip includes:
a first fixing portion configured to be connected with the trolley;
a second fixing portion configured to be connected with the trolley and located below a bottom of the first fixing portion, wherein the first fixing portion and the second fixing portion are on an axial line; and
a body defined between the first fixing portion and the second fixing portion, wherein a first end of the body is connected with an outer side of the first fixing portion, and a second end of the body is connected with a rear side of the second fixing portion; the body includes a first extending portion, a first connection portion, a second extending portion, a second connection portion, and a third extending portion, such that the handle structure is configured to have various changes of angles and heights of the respective one grip by way of the first extending portion, the first connection portion, the second extending portion, the second connection portion and the third extending portion;
wherein a connection direction of an end of the body and the first fixing portion is different from a connection direction of the other end of the body and the second fixing portion, an offset angle is defined between the first extending portion and the axial line with respect to the third extending portion and the axial line, and the offset angle is within 30 degrees to 135 degrees.

2. The handle structure as claimed in claim 1, wherein the body includes a first spaced section and a second section which are separated on a middle portion of the body, wherein the first spaced section is connected with the first fixing portion, and the second spaced section is connected with the second fixing portion.

3. The handle structure as claimed in claim 1, wherein the first fixing portion and the second fixing portion are located on a tube, and the first fixing portion and the second fixing portion are one-piece formed.

4. The handle structure as claimed in claim 2, wherein the first fixing portion and the second fixing portion are located on a tube, and the first fixing portion and the second fixing portion are one-piece formed.

5. The handle structure as claimed in claim 1, wherein the trolley includes a holder configured to hold objects, at least one rack connected on a side of the holder, and multiple rollers fixed on a bottom of the holder; wherein the at least one rack includes two columns spaced from each other and extending uprightly, and the first fixing portion and the second fixing portion are fitted on a top of the respective one column.

6. The handle structure as claimed in claim 1, wherein the offset angle between the first extending portion and the axial line with respect to the third extending portion and the axial line is within 65 degrees to 85 degrees, and the first connection portion and the second connection portion are curved.

7. A handle structure of a trolley comprising:
two grips symmetrically mounted on the trolley, and a respective one grip includes:
a first fixing portion configured to be connected with the trolley;

a second fixing portion configured to be connected with the trolley and located below a bottom of the first fixing portion, wherein the first fixing portion and the second fixing portion are on an axial line; and a body defined between the first fixing portion and the second fixing portion, wherein a first end of the body is connected with an outer side of the first fixing portion, and a second end of the body is connected with a rear side of the second fixing portion; the body includes a first extending portion extending outward from the first fixing portion, a first connection portion extending from the first extending portion, a second extending portion extending from the first connection portion, a second connection portion extending downward from the second extending portion, and a third extending portion extending downward from the second connection portion, wherein the third extending portion is connected with the second fixing portion, the first extending portion and the second extending portion are horizontal, the third extending portion is inclined, and the first connection portion and the second connection portion are curved; an angle of the second portion is more than an angle of the first connection portion, such that the handle structure is configured to have various changes of angles and heights of the respective one grip by way of the first extending portion, the first connection portion, the second extending portion, the second connection portion and the third extending portion;

wherein a connection direction of an end of the body and the first fixing portion is different from a connection direction of the other end of the body and the second fixing portion, an offset angle is defined between the first extending portion and the axial line with respect to the third extending portion and the axial line, and the offset angle is within 30 degrees to 135 degrees.

8. The handle structure as claimed in claim 7, wherein the body includes a first spaced section and a second section which are separated on a middle portion of the body, wherein the first spaced section is connected with the first fixing portion, and the second spaced section is connected with the second fixing portion.

9. The handle structure as claimed in claim 7, wherein the first fixing portion and the second fixing portion are located on a tube, and the first fixing portion and the second fixing portion are one-piece formed.

10. The handle structure as claimed in claim 8, wherein the first fixing portion and the second fixing portion are located on a tube, and the first fixing portion and the second fixing portion are one-piece formed.

11. The handle structure as claimed in claim 7, wherein the trolley includes a holder configured to hold objects, at least one rack connected on a side of the holder, and multiple rollers fixed on a bottom of the holder; wherein the at least one rack includes two columns spaced from each other and extending uprightly, and the first fixing portion and the second fixing portion are fitted on a top of the respective one column.

12. The handle structure as claimed in claim 7, wherein the offset angle between the first extending portion and the axial line with respect to the third extending portion and the axial line is within 65 degrees to 85 degrees.

* * * * *